United States Patent
Thiele et al.

(10) Patent No.: US 6,299,245 B1
(45) Date of Patent: Oct. 9, 2001

(54) WIND DEFLECTOR AND SUNSHADE STOPPING SYSTEM, AND METHOD OF USING SAME

(75) Inventors: Steven R. Thiele, Marysville; Akihiko Kuribayashi, Dublin, both of OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/439,384

(22) Filed: Nov. 15, 1999

(51) Int. Cl.[7] .................................. B60J 7/04; B60J 7/22
(52) U.S. Cl. ............................. 296/214; 296/217
(58) Field of Search ...................... 296/214, 217

(56) References Cited

U.S. PATENT DOCUMENTS

| | | | |
|---|---|---|---|
| 3,984,143 | * 10/1976 | Vermeulen | 296/217 |
| 4,482,183 | * 11/1984 | Grimm et al. | 296/217 |
| 4,681,364 | 7/1987 | Bienert | 296/217 |
| 4,705,316 | * 11/1987 | Jardin et al. | 296/217 |
| 4,738,483 | * 4/1988 | Boots | 296/217 |
| 4,971,387 | 11/1990 | Bohm | 296/217 |
| 4,986,598 | 1/1991 | Yamauchi | 296/217 |
| 5,671,970 | * 9/1997 | Edelmann | 296/217 |
| 5,734,727 | 3/1998 | Flaherty | 296/217 X |

FOREIGN PATENT DOCUMENTS

3333215 * 3/1985 (DE) ..................... 296/217

\* cited by examiner

*Primary Examiner*—Dennis H. Pedder
(74) *Attorney, Agent, or Firm*—Carrier Blackman & Associates; Joseph P. Carrier; William D. Blackman

(57) ABSTRACT

A wind deflector and sunshade stopper system for use with a vehicle having a sliding roof panel and a sliding sunshade disposed below the sliding roof panel. The stopper system includes a wind deflector in combination with a sunshade stopper. The wind deflector portion of the system, when installed on a vehicle, is movable between an operative position projecting above a sliding roof opening defined in a fixed roof of the vehicle, and a closed position disposed below the opening. The sunshade stopper portion of the system is adapted to be fixed to a vehicle body. One portion of the sunshade stopper contacts the wind deflector in the closed position thereof to inhibit movement of the deflector; and another portion of the sunshade stopper contacts the sliding sunshade in a closed position thereof to inhibit movement of the sunshade. The sunshade stopper may include an elastomeric cover disposed over a rigid base, and the wind deflector may further comprise: a pair of support arms at opposite sides thereof, respectively, for exclusively connecting the deflector to the roof frame for pivoting movement between the operative and closed positions thereof; and a height control arm provided on the wind deflector and projecting therefrom, the height control arm has a stopper which contacts the fixed roof of the vehicle in the operative position of the wind deflector for limiting a height to which the deflector projects above the sliding roof opening, and the arm stopper also protecting the height control arm from contact with the roof frame when the wind deflector is in the closed position thereof.

21 Claims, 3 Drawing Sheets

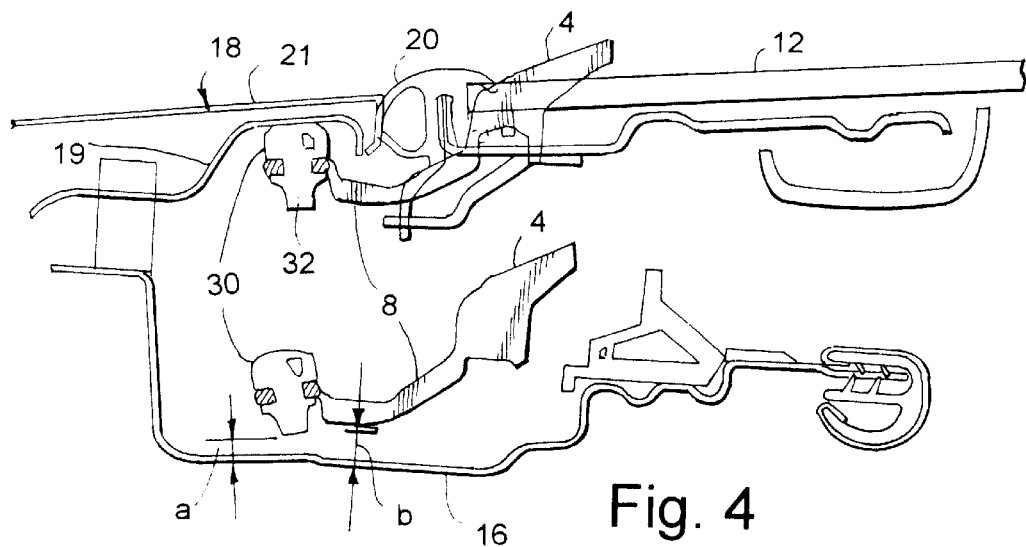
Fig. 4
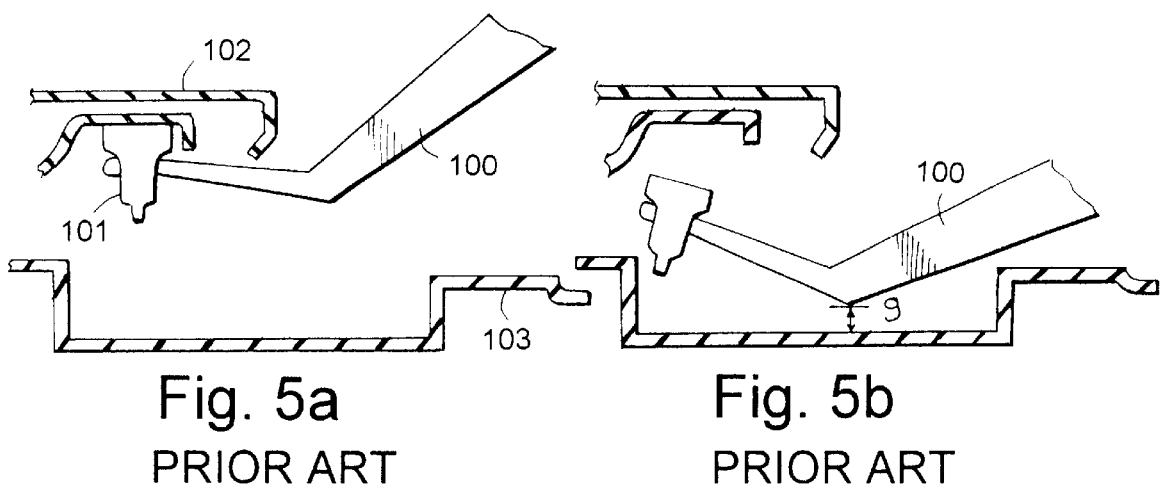
Fig. 5a
PRIOR ART
Fig. 5b
PRIOR ART
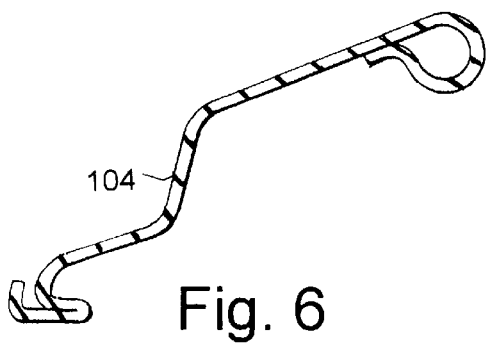
Fig. 6
PRIOR ART
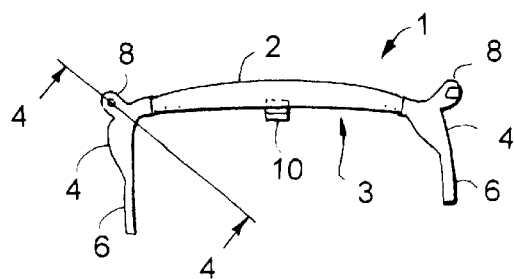
Fig. 3

WIND DEFLECTOR AND SUNSHADE STOPPING SYSTEM, AND METHOD OF USING SAME

BACKGROUND OF THE INVENTION

1. Field of the invention

The present invention relates to a wind deflector and sunshade stopping system for a sliding roof panel in a vehicle, wherein the wind deflector is movable between an operative position projecting through an opening in the vehicle roof when the sliding panel is open, and a storage position below the opening when the sliding panel is closed. More particularly, the present invention relates to such wind deflector and sunshade stopping system which is reduced in size, has improved aerodynamics and vibration characteristics, and has a simpler structure than conventional wind deflector apparatus.

2. Description of the Background Art

In the automotive industry, there are many known wind deflector devices associated with sliding roof panels, which move between operative and storage positions as the sliding roof panels are moved between open and closed positions thereof.

Some examples of known wind deflector devices having the conventional limitations and disadvantages associated therewith are disclosed in U.S. Pat. Nos. 4,681,364 (Bienert et al.), 4,971,387 (Böhm), and 4,986,598 (Yamaguchi et al.).

All of such known wind deflector devices function appropriately, but have limitations and disadvantages associated therewith in terms of height requirements, vibrations and rattles, complexity, etc.

Conventionally, it is known that wind deflector devices should project to at least a certain degree above the fixed roof (when the sliding roof panel is in an open position thereof) so as to achieve desired aerodynamic effects. There is, however, the competing criteria that the overall roof panel devices should not have too great a vertical dimension (especially in the closed position thereof) because this reduces head room in the passenger compartment, so that it is not desirable to simply increase the vertical dimension of the wind deflector for achieving a sufficiently large projection of the wind deflector in the open position of the sliding roof panel.

Also, conventional wind deflectors have a tendency to vibrate and rattle when they contact the vehicle roof, the support frame for the sliding roof panel, etc. during vehicle travel, especially in the closed position of the sliding roof panel. To avoid this, vibration damping members have been provided on portions of the wind deflector, the vehicle roof, and other portions of the sliding roof panel devices, and clearance gaps are provided between portions of the wind deflector and other components which they might contact. The provision of vibration damping members increases the cost and complexity of the sliding roof panel devices, while the provision of clearance gaps, again, undesirably increases the vertical dimension of the devices.

For example, with reference to FIGS. 5A, 5B, there are shown side sectional views of a known arm member 100 extending from a wind deflector for controlling the projecting height of the deflector in the open position of the sliding roof panel. In FIG. 5A the deflector is in the open position thereof, and a rubber stopper 101 on the end of arm 100 engages a lower surface of a fixed roof 102 that surrounds an opening for the sliding roof panel, thereby controlling the projecting height of the deflector, and also stabilizing the deflector, damping vibrations and preventing damaging contact between the arm 100 and the roof 102. In FIG. 5B the deflector is in the closed position thereof, and a clearance gap "g" is provided between a lowermost, intermediate portion of the arm 100 and a frame 103 for the sliding roof device to prevent contact and vibrations therebetween.

Further, with reference to FIG. 6 there is shown a side sectional view of a prior wind deflector 104 formed from stamped sheet metal, and co-owned by the assignee of the present application. With reference to FIG. 7, there is shown a side perspective view of one side of the prior wind deflector of FIG. 6, with a dual pivot connection between one side of the wind deflector 104 and a frame 105 for a sliding roof panel (not shown). The connection includes a first, longer pivot arm 106 and a second, shorter pivot arm 107 connected between the frame and an end piece of the deflector 104. Another pivot connection (not shown) is provided with another end piece on the opposite side of the deflector, and together the two dual pivot connections control movements of the deflector between open and closed positions thereof Although the prior dual pivot connection functions appropriately, it is relatively complex and expensive.

As will be understood there remains a significant need in the art for a simple, low-cost, compact and aerodynamic wind deflector for use with sliding roof panels.

SUMMARY OF THE INVENTION

According to a first aspect of the present invention there is provided a wind deflector and sunshade stopping system for use with a vehicle having a sliding roof panel and a sliding sunshade disposed below the sliding roof panel A stopping system according to the present invention includes a wind deflector in combination with a sunshade stopper. The wind deflector portion of the system, when installed on a vehicle, is movable between an operative position projecting above a sliding roof opening defined in a fixed roof of the vehicle, and a closed position disposed below the opening. The sunshade stopper portion of the system is adapted to be fixed to a vehicle body. One portion of the sunshade stopper contacts the wind deflector in the closed position thereof to inhibit movement of the deflector, and another portion of the sunshade stopper contacts the sliding sunshade in a closed position thereof to inhibit movement of the sunshade.

The sunshade stopper may include an elastomeric cover disposed over a rigid base. The wind deflector may be formed of extruded metal and includes an upper portion with a projecting rear surface that contacts the stopper at a transversely central section of the deflector, and a lower portion spaced from a bottom surface of the roof frame by a gap of 2.5–6 mm in the closed position of the deflector.

The system may further comprise: a pair of support arms at opposite sides of the wind deflector, respectively, for exclusively connecting the deflector to the roof frame for pivoting movement between the operative and closed positions thereof; and a height control arm provided on the wind deflector and projecting therefrom, the height control arm having a stopper which contacts the fixed roof of the vehicle in the operative position of the wind deflector for limiting a height to which the deflector projects above the sliding roof opening, and the arm stopper also protecting the height control arm from contacting the roof fine when the wind deflector is in the closed position thereof.

Such wind deflector and sunshade stopping system according to the first aspect of the invention has advantages over conventional structures. For example, because the deflector is positively inhibited from movement by its contact with the sunshade stopper in the closed position of the deflector, the deflector can be disposed with small clearance relative to the roof frame, the sliding roof panel, etc., without causing undesirable contact between the deflector and the other components during vehicle travel. This permits the overall sliding roof apparatus to have a tight, compact arrangement, while still permitting the deflector to have a relatively large vertical dimension when deployed, so that it projects sufficiently above the roof opening to achieve good aerodynamic characteristics in the operative position thereof. This is similarly true of the height control arms with the arm stoppers because the arms permit the deflector to project a controlled, optimum amount through the roof opening, while these stoppers, again, permit the arms to be disposed with close tolerance to the roof frame, etc. in the closed position of the deflector for a tight, compact arrangement.

Further, the wind deflector and sunshade stopping system as defined has a desirably simple, and hence economic structure, noting that the sunshade stopper achieves a dual function of stopping both the deflector and the sliding sunshade, the arm stoppers function to prevent direct contact between the arms and other components in both the operative and closed positions of the deflector, the conventional need for additional protective pads between parts of the wind deflector and other components of the sliding roof device is eliminated, the support arms for the deflector have a simple pivoting arrangement, etc.

According to a second aspect of the invention, there is provided a height control apparatus for a wind deflector used together with a sliding roof panel in a vehicle, wherein the wind deflector is movable between an operative position projecting above an opening for the sliding roof panel in a fixed roof of the vehicle and a closed position disposed below the opening, the height control apparatus comprising: a height control arm provided on the wind deflector; and a stopper provided on the height control arm; the arm stopper contacting the fixed roof of the vehicle in the operative position of the wind deflector for limiting a height to which the deflector projects above the roof opening, and the arm stopper protecting the height control arm from contacting the roof frame for the sliding roof panel when the deflector is in the closed position thereof.

An arm stopper, may be provided on the wind deflector, while the arm stopper may have an upper surface which contacts the fixed roof in the open position of the wind deflector, and a lower projecting portion which is disposed closer to the roof frame than is any portion of the height control arm in the closed position of the wind deflector. Also, the deflector arms may be rigidly fixed to the ends of the wind deflector and project diagonally forward therefrom, a remote ends of the projecting portion of the arm stopper may have a flat engaging surface and may be substantially circular in cross section and, the height control arm may have a smaller vertical height than that of the arm stopper in the closed position of the deflector.

Again, the height control apparatus according to this second aspect of the invention permits the wind deflector to have a sufficient vertical height in the operative position thereof, while still having an overall tight, compact arrangement for the sliding roof, and the apparatus has a desirably simple structure which avoids rattles and vibrations during vehicle travel.

It is an object of the present invention to provide a movable wind deflector apparatus for use with a sliding roof panel on a vehicle, wherein the deflector apparatus has excellent aerodynamic characteristics in the operative position thereof, but which also is tightly and compactly arranged with the sliding roof panel in a closed position thereof.

It is another object of the invention to provide such a wind deflector apparatus which does not cause vibrations and rattles to any significant extent during vehicle travel.

It is yet another object of the invention to provide such a wind deflector apparatus which is simply and economically constructed from a small number of components.

Still another object of the invention is to provide such a wind deflector apparatus with means for controlling a projecting height thereof in the deflector's operative position, but which does not significantly complicate the apparatus, nor cause vibrations and rattles of the apparatus during vehicle travel.

For a more complete understanding of the present invention, including other objects, advantages and salient features thereof, the reader is referred to the following detailed description of the preferred embodiment thereof, which should be read in conjunction with the accompanying drawings. Throughout the following detailed description and in the drawings, like numbers refer to like parts.

BRIEF DESCRIPTION OF THE DRAWINGS

FIG. 3 is a top plan view of the wind deflector apparatus of FIG. 1;

FIG. 4 is a side sectional view looking in the direction of line 4—4 in FIG. 3 to better show the structure of a height controlling deflector arm thereof, and also showing the deflector in both the operative and closed positions thereof;

FIGS. 5A and 5B are side views of a known design for height controlling arm of a wind deflector apparatus, wherein the arm is shown in operative and storage positions thereof, respectively;

FIG. 6 is a side sectional view of a prior wind deflector apparatus formed of stamped sheet metal.

DETAILED DESCRIPTION OF THE PRESENT EMBODIMENT

Figure 1:
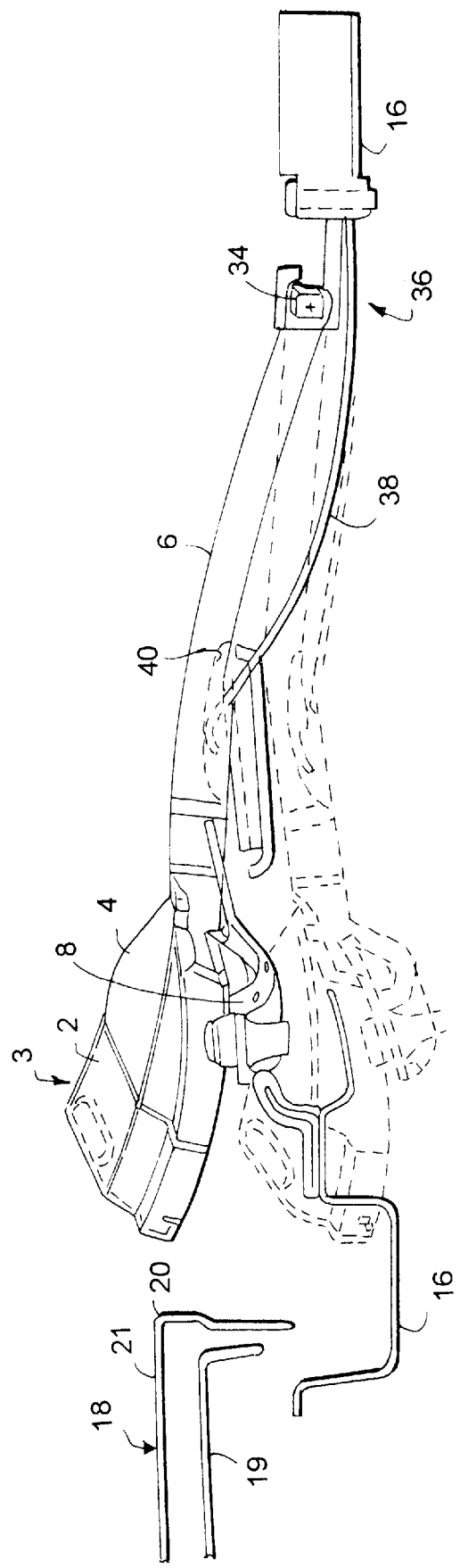
FIG. 1 is a side perspective view of a wind deflector apparatus in accordance with a present embodiment of the invention, showing part of a roof structure in cross section, with the deflector in its operative position shown in solid lines and the deflector in its closed position shown in phantom.

Referring now to FIGS. 1–4 of the drawings, there is shown a wind deflector and sunshade stopper system 1 in accordance with a present embodiment of the invention, together with some additional structure of a sliding roof panel device on a vehicle. The system 1 includes a wind deflector 3 comprised of a main central portion 2 that extends transversely of the vehicle and a pair of end pieces 4 connected to opposite ends of the central portion, a pair of support arms 6 (only one of which is shown in FIG. 1) connected to the end pieces 4, respectively, for pivotally moving the deflector 3 between operative and closed positions thereof, a pair of deflector height control arms 8 fixed to the end pieces 4, respectively and projecting diagonally forward therefrom, and a sunshade stopper 10 (see FIG. 2) which contacts and positively inhibits movement of the deflector in the closed position thereof. Also generally shown in FIGS. 1–4 are a sliding roof panel 12, a sliding sunshade 14, a roof frame 16 which supports the sliding roof panel and the wind deflector apparatus, and a fixed roof 18 comprised of exterior roof panel 21 and roof stiffener 19 of the vehicle, which has defined therein an opening 20 that is selectively opened and closed by the sliding roof panel 12.

The main portion 2 of the wind deflector 3 is preferably a rigid member formed of an extruded lightweight metal such as aluminum and will have a transverse length somewhat shorter than that of the opening 20 in the fixed roof. In cross section, the portion 2 includes an upper section 22 (FIG. 2) with a downwardly projecting rear surface that defines a substantially elliptical closed space therein, and a lower section 24. This is substantially different than the shape of the prior stamped sheet metal deflector 104 shown in FIG. 6, especially in that the extruded deflector portion 2 has a significantly larger vertical dimension. This desirably permits the deflector to project further above the opening 20 than the prior deflector 104 for better aerodynamic characteristics. For example, the wind deflector of the present invention may project above the roof opening 20 by a distance of 15–20 mm. Also, with reference to FIGS. 2 and 6, when considered in cross section, the deflector 3 of the invention has a greater vertical height than its horizontal length, whereas the prior deflector 104 has a much larger horizontal length than its vertical height. The greater vertical dimension of the deflector 3 does not, however, cause the overall sliding panel device (including the deflector) to have a significantly increased vertical dimension, as discussed further below. Also, the main portion 2 of the deflector is curved when viewed in plan, see FIGS. 1 and 3, extending slightly rearwardly from the middle towards the end pieces 4. Although the main deflector portion 2 is preferably formed of extruded aluminum or the like, it could alternatively be constructed of stamped sheet metal, molded plastic or other appropriate materials.

Figure 2:
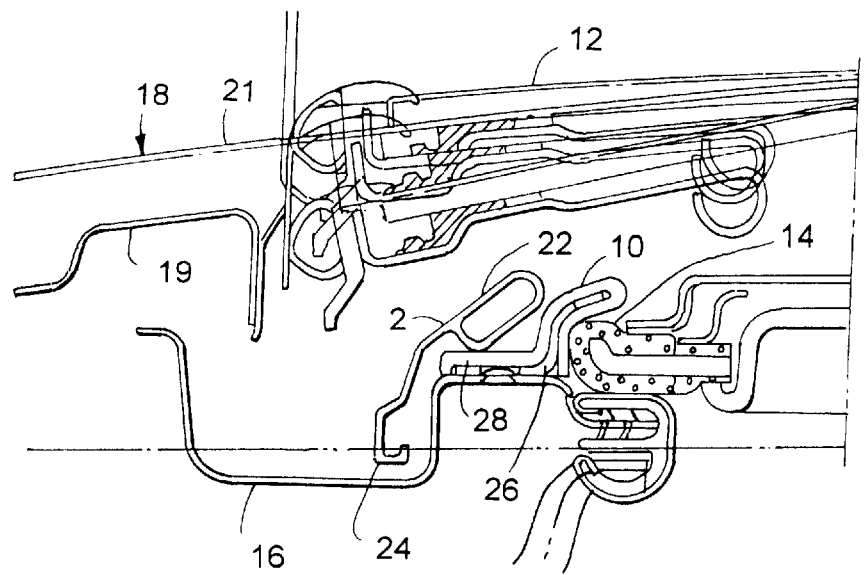
FIG. 2 is a side sectional view of an overall sliding roof panel device the apparatus, including the wind deflector apparatus of FIG. 1, and wherein the sliding roof panel is shown in three different positions thereof.

The sunshade stopper 10 preferably includes arigid base member 26 of metal fixed to the roof frame 16 and an outer elastomeric member 28 of rubber or the like bonded to and covering the upper surface of the base member 26. As shown in FIG. 2, a rear portion of the sunshade stopper is curved rearwardly and upwardly and contacts a front portion of the sliding sunshade 14 when the sunshade is in the closed position thereof, so as to positively inhibit movement of the sunshade during travel for thereby avoiding squeaks, rattles, etc.; whereas a front portion of the stopper 10 contacts the rear projecting surface of the upper portion 22 of the main deflector portion 2 when the deflector is in the closed position thereof for, again, positively inhibiting movement of the deflector 3 and associated squeaks, rattles, etc. The stopper 10 is preferably only approximately 50 mm wide in the lateral direction and is disposed in a transversely central portion of the vehicle so that it contacts a transversely central section of the wind deflector 3.

Because the engagement between the wind deflector 3 and the stopper 10 positively inhibits movement of the deflector in its closed position the deflector is disposed with relatively close tolerances to other components of the sliding roof device. For example the lower section 24 of the deflector portion 2 is disposed within 2.5–6 mm of the bottom surface of the roof frame 16, while the upper section 22 of the deflector portion 2 is disposed within 5–8 mm of the lower surface of the sliding roof panel 12 when the panel is in a inwardly tilted orientation thereof Note that in FIG. 2, looking from bottom to top, the panel 12 is shown in three different positions thereof, i.e., a lower position tilted up slightly from a filly closed position, a middle, fully closed position, and an upper position tilted at the rear of 20 significantly inwardly of the vehicle prior to rearward sliding movement of the panel. The assignee of the present application has previously used a sunshade stopper such as the stopper 10 for engaging a sliding sunshade in a closed position thereof, but the prior sunshade stopper was not used for additionally stopping or engaging a wind deflector.

Figure 7:
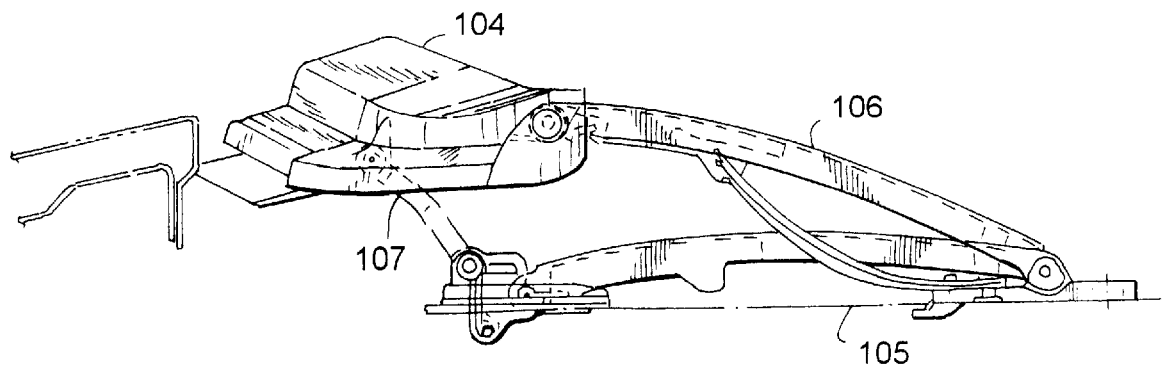
FIG. 7 is a side perspective view of a prior wind deflector apparatus including dual pivot support arm connection to a roof frame.

In prior sliding roof panel devices, such as that including the wind deflector 104 in FIGS. 6–7, the deflector was not positively stopped in a closed position thereof so that it does move to some extent during vehicle travel, and it has been necessary to provide larger clearance gaps between the deflector and other components of the sliding roof device to avoid contact therebetween, and the resulting squeaks and rattles. For example, a clearance gap of 5–10 mm would be provided between the lower end of the deflector 104 and the roof frame 105. Also, in the prior devices additional vibration absorbing members, such as felt and rubber pads or deflector to frame seals, have been provided to prevent contact between the wind deflector and other components, such as between the lower end of the prior deflector 104 and the roof frame 105.

The end pieces 4 at the opposite ends of the main portion 2 of the deflector 3 may be formed of an injection molded material such as thermoplastic and other polymeric materials, or of a die cast lightweight metal such as aluminum, and are connected to opposite ends of the main portion using fasteners such as rivets or other appropriate connecting means. Also, each of the end pieces will preferably have one of the deflector height control arms 8 and one of the support arms 6 formed integrally therewith. Alternatively, the arms 6 and/or 8 could be formed separately and then joined to the end pieces 4, while the end pieces could be formed of other materials, such as stamped sheet metal, extruded metal and thermosetting plastic.

Each of the deflector height control arms 8 projects diagonally forward from the corresponding end piece 4, and has an arm stopper 30 provided on the projecting end thereof. When the wind deflector 3 is in the raised, operative position thereof, the deflector height control arms 8 engage a lower surface of the fixed roof 18 through the arm stoppers 30 (see FIG. 4), which thereby positively limits or controls the extent of upward projection of the deflector through the roof opening 20. As shown, the deflector height control arms 8 are curved slightly upwardly with a small angle to horizontal, whereas the stopper 30 has a greater vertical height than does the arm 8 when the deflector 3 is in the closed position thereof. This arm and stopper are desirable in comparison to the conventional arm 100 shown in FIGS. 5A, 5B, which has greater degree of concavity, because the present arrangement permits the arm 8 and associated components of the overall sliding roof device to have a smaller vertical dimension than the prior arm 100. Specifically, the arm 8 itself has a smaller vertical dimension than the arm 100. Moreover, in the prior arrangement an intermediate portion of the arm 100 was disposed closest to the roof frame 103 when the deflector was in its closed position, so that a sufficiently large clearance gap "g" had to be provided therebetween to avoid contact between these components during vehicle travel. Such a large gap is not necessary with the arm 8 of the invention, as discussed below.

The arm stoppers 30 are the actual operative members which engage the fixed roof 18 and are preferably formed of an elastomeric material such as rubber so that there is no direct contact between the arms 8 and the fixed roof 18, which would otherwise cause damage to the roof and or arms, and create undesirable vibrations and rattles. According to an important aspect of the invention, the arm stoppers 30 also protect the arms 8 from contact with the roof frame 16 when the deflector 3 is in the closed position thereof. Particularly with reference to FIG. 4, a lower projecting end 32 of the stopper is disposed closer to the roof frame 16 than is any portion of the arm 8 in the closed position of the wind deflector, again, noting the greater vertical height of the stopper 30 in comparison to the arm 8. For example, the gap "a" between the stopper end 32 and the roof frame 16 may be 2.5 mm, while the gap "b" between the lowermost surface of the arm 8 and the roof frame is 3.9 mm. With such arrangement, if the deflector arm 8 were moving toward the roof frame during vehicle travel, the stopper end 32 will contact the frame and inhibit further movement of the arm 8 toward the frame, so that the arm itself will not contact the frame to cause rattles, squeaks, etc.

As shown, the lower projecting end 32 of the arm stopper 30 has a flat lower surface and is substantially circular in cross section when looking upwardly at the end. This is desirable in comparison to a pointed end, such as that on the prior stopper shown in FIGS. 5A, 5B, because the arm stopper 30 does not contact the roof frame at a perfectly vertical or perpendicular orientation, but contacts it at an angle θ to vertical, and the round, thick shape of the end 32 permits the stopper to have greater contact area with the roof frame in such engaging orientation.

Again, and with reference to FIG. 1, the supporting arms 6 for the wind deflector respectively have ends which are fixed to the end pieces 4. Opposite ends 34 of the arms 6 are simply pivotally supported on the roof frame 16, while a spring assist mechanism 36 is also associated with each of the arms 6 to facilitate movements of the arms. The spring assist mechanism includes a leaf spring 38 having one end fixed to the frame 16 and an opposite end engaged with a recess 40 defined in a lower surface of the arm 6.

As will be understood, from the foregoing, the overall wind deflector and sunshade stopper system according to the invention has many advantages over prior wind deflector apparatus: including the tight, compact arrangement of the deflector components relative to other components of the sliding roof device as permitted by the shape of the deflector 3, the use and particular shape of the deflector arms, and the use of the sunshade and deflector arm stoppers; desirable aerodynamic characteristics of the deflector as permitted by its greater vertical dimension, which does not otherwise increase the height of the overall sunroof device; and its very simple structure, noting that the total number of parts for the wind deflector apparatus of the invention is less than ⅓ of the total number of parts for the prior device shown in FIG. 7.

Although the present invention has been described herein with respect to the preferred embodiment thereof, the foregoing description is intended to be illustrative, and not restrictive. Those skilled in the art will realize that many modifications of the preferred embodiments could be made without departing from the spirit or essence of the invention. For example, although the invention is described as including a pair of the height control arms 8 on opposite ends of the wind deflector 3, it is possible to use only a single arm projecting forwardly from a transversely center section of the main deflector portion 2, or the arms 8 could be project forwardly from transversely spaced portions of the main portion 2, or more than two of the arms 8 may be used. All such modifications which are within the scope of the claims are intended to be within the scope and spirit of the present invention.

What we claim is:

1. A wind deflector and sunshade stopper system for use with a vehicle having a sliding roof panel and a sliding sunshade disposed below the sliding roof panel, the system comprising:
   a wind deflector, which when installed on a vehicle, is movable between an operative position projecting above a sliding roof opening defined in a fixed roof of the vehicle, and a closed position disposed below the opening; and
   a sunshade stopper for being fixed to a vehicle body and for limiting movement of the sliding sunshade disposed below the sliding roof panel;
   one portion of the sunshade stopper for contacting the wind deflector in the closed position thereof to inhibit movement of the deflector; and
   another portion of the sunsbade stopper for contacting the sliding sunshade in a closed position thereof to inhibit movement of the sunshade.

2. The system of claim 1, wherein said wind deflector includes an upper portion with a projecting rear, lower surface, and said sunshade stopper contacts said projecting rear, lower surface of the upper portion of the wind deflector at a transversely central section of the wind deflector.

3. The system of claim 2, wherein said upper portion of the wind deflector defines an enclosed space therein when the deflector is viewed in cross section.

4. The system of claim 1, wherein the vehicle body includes a roof frame for the sliding roof panel, said sunshade stopper includes a rigid base adapted to be fixed to the roof frame and an elastomeric cover disposed over said base.

5. The system of claim 1, wherein said wind deflector is operable to project above the fixed roof of the vehicle by at least 15 mm when the deflector is in the operative position thereof.

6. The system of claim 1, wherein a lower portion of said wind deflector is spaced from a bottom surface of the roof frame when the wind deflector is in the closed position thereof.

7. The system of claim 1, further comprising a pair of support arms at opposite sides of the wind deflector, respectively, which support arms function as an exclusive connection between the wind deflector and the roof frame when the wind deflector is installed on the vehicle.

8. The system of claim 7, wherein each of said support arms has one end fixed to the wind deflector and an opposite end for being pivotally supported on the roof frame.

9. A system of claim 1, further including a deflector height control arm extending from the wind deflector for limiting a height to which the deflector projects above the opening in the fixed roof when the deflector is in the operative position thereof, and a flexible stopper provided on the height control arm which contacts the fixed roof in the operative position of the deflector and which also protects the height control arm from contact with the roof frame when the deflector is in the closed position thereof.

10. The system of claim 9, wherein a lower end of the height control arm stopper is disposed closer to the roof frame than is any portion of the height control arm when the deflector is in the closed position thereof.

11. The system of claim 9, wherein an upper surface of said height control arm stopper contacts said fixed roof when the deflector is in the operative position thereof, and a lower portion of the height control arm stopper disposed closest to the roof frame in the closed position of said deflector has a flat lower face and is substantially circular in cross section.

12. The system of claim 11, wherein the height control arm stopper extends at an angle at other than a right angle relative to the roof frame in the closed position of said deflector.

13. The system of claim 9, wherein the height control arm stopper has a greater vertical height than that of the height control arm in the closed position of the deflector.

14. The system of claim 9, including a pair of said height control arms extending diagonally forward from opposite ends of said wind deflector.

15. The system of claim 1, wherein said wind deflector includes a central portion extending transversely of the vehicle when the wind deflector is installed thereon, and a pair end pieces connected to opposite ends of the central portion, said sunshade stopper contacting a transversely intermediate section of the central portion when said deflector is in the closed position thereof.

16. The system of claim 15, wherein said central portion of the wind deflector is formed of an extruded, lightweight metal.

17. The system claim 15, wherein a cross section of said central portion of the wind deflector has a greater vertical height than its longitudinal length.

18. A wind deflector for use together with a sliding roof panel in a vehicle, wherein the wind deflector, when installed on a vehicle, is movable between an operative position projecting above an opening for the sliding roof panel in a fixed roof of the vehicle and a closed position disposed below the opening, the wind deflector comprising:

a wind deflector main body for placement proximate a front edge of an opening in a vehicle roof;

at least one height control arm provided on and projecting outwardly from the wind deflector main body, the height control arm formed from a substantially rigid material and having a first end attached to the wind deflector main body, and a free end opposite the first end; and a stopper provided on the free end of the height control arm;

the arm stopper being operable to contact the fixed roof of the vehicle in the operative position of the wind deflector for limiting a height to which the deflector projects above the roof opening, and the arm stopper further being operable to protect the height control arm from contact with a roof frame for the sliding roof panel when the deflector is in the closed position thereof.

19. The height control of claim 18, wherein a lower end of the arm stopper is disposed closer to the roof frame than any portions of the height control arm when the deflector is in the closed position thereof.

20. The height control apparatus of claim 18, wherein the height control arm is rigidly fixed to the wind deflector and extend forwardly therefrom, and said arm stopper has a greater vertical height than that of the height control arm in the closed position of the deflector.

21. A sunroof assembly for use with a vehicle, the apparatus comprising:

a wind deflector, for installing on a vehicle so as to be movable between an operative position projecting above a roof opening defined in a fixed roof of the vehicle, and a closed position disposed below the roof opening;

a sliding roof panel slidably disposed with respect to the vehicle roof;

a sliding sunshade slidably disposed below the sliding roof panel; and a sunshade stopper for being fixed to a vehicle body between the wind deflector and the sunshade, and for limiting movement of the sliding sunshade;

a first portion of the sunshade stopper being operable to contact the wind deflector in the closed position thereof, to limit downward movement of the deflector; and a second portion of the sunshade stopper being operable to contact the sliding sunshade in a closed position thereof, to limit forward movement of the sunshade.

* * * * *